United States Patent
Cosentino et al.

(10) Patent No.: US 10,764,216 B2
(45) Date of Patent: Sep. 1, 2020

(54) EMULATING USER COMMUNICATIONS IN A COMMUNICATION SESSION TO PROTECT INFORMATION

(71) Applicant: International Business Machines Corporation, Armonk, NY (US)

(72) Inventors: Davide Cosentino, Palermo (IT); Nicola Milanese, Rome (IT); Pietro Marella, Rome (IT); Anna Ciotti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/002,582

(22) Filed: Jun. 7, 2018

(65) Prior Publication Data
US 2019/0379614 A1    Dec. 12, 2019

(51) Int. Cl.
*H04L 12/58* (2006.01)
*G06F 40/30* (2020.01)
*G06F 40/253* (2020.01)

(52) U.S. Cl.
CPC ............ *H04L 51/02* (2013.01); *G06F 40/253* (2020.01); *G06F 40/30* (2020.01); *H04L 51/046* (2013.01)

(58) Field of Classification Search
CPC ..... H04L 51/02; H04L 51/00; G06F 17/2785; G06F 17/274
See application file for complete search history.

(56) References Cited

U.S. PATENT DOCUMENTS

| 8,145,708 | B2 | 3/2012 | Biggs et al. | |
|---|---|---|---|---|
| 8,913,721 | B1 | 12/2014 | Narayanan et al. | |
| 9,781,099 | B1 | 10/2017 | Brinskelle | |
| 2004/0111479 | A1 | 6/2004 | Borden et al. | |
| 2008/0130842 | A1* | 6/2008 | Johri | H04M 3/2281 379/88.04 |
| 2011/0029618 | A1 | 2/2011 | Lavy et al. | |
| 2015/0052594 | A1* | 2/2015 | Liberman | H04L 9/3231 726/6 |

OTHER PUBLICATIONS

Anonymous, "Messaging Security Agents", Trend Micro Incorporated, 2013, 1 page.
Anonymous, "During-conversation peer initiated identity challenging and authentication algorithm for instant messaging systems", IPCOM000140902D, 2006, 2 pages.

\* cited by examiner

*Primary Examiner* — El Hadji M Sall
(74) *Attorney, Agent, or Firm* — L. Jeffrey Kelly; SVL IPLaw

(57) ABSTRACT

A computer system emulates user communications within a communication session. Communications between a user and at least one participant are monitored to determine that a message from a user from the at least one participant includes content pertaining to a problematic event. The user is replaced with a communication agent in the communication session and a response is generated to the message utilizing natural language processing to emulate a conversational style of the user. Using the communication agent, the response is sent to the at least one participant in the communication session to address the problematic event. Embodiments of the present invention further include a method and program product for emulating user communications within a communication session in substantially the same manner described above.

18 Claims, 4 Drawing Sheets

EMULATING USER COMMUNICATIONS IN A COMMUNICATION SESSION TO PROTECT INFORMATION

BACKGROUND

Present invention embodiments relate to communications systems, and more specifically, to monitoring communications of a communication session and emulating a user to address problematic events.

A communication agent, also known as a chatbot, refers to a computer application capable of conversing with humans. A communication agent may use natural language processing techniques in order to participate in a conversation without giving away its synthetic nature to the other conversation participants.

When an individual converses on online platforms such as chat rooms, social media websites, or messaging applications, the individual may be subjected to problematic events, such as awkward social situations, inappropriate language, or even attempted cybercrime attacks. Inexperienced individuals may not know how to properly react when they find themselves facing a problematic event. Furthermore, some individuals may not be capable of distinguishing between legitimate and illegitimate online interactions in the first place.

SUMMARY

According to one embodiment of the present invention, a computer system emulates user communications within a communication session. Communications between a user and at least one participant are monitored to determine that a message from a user from the at least one participant includes content pertaining to a problematic event. The user is replaced with a communication agent in the communication session and a response is generated to the message utilizing natural language processing to emulate a conversational style of the user. Using the communication agent, the response is sent to the at least one participant in the communication session to address the problematic event. Embodiments of the present invention further include a method and program product for emulating user communications within a communication session in substantially the same manner described above.

BRIEF DESCRIPTION OF THE DRAWINGS

Generally, like reference numerals in the various figures are utilized to designate like components.

DETAILED DESCRIPTION

Present invention embodiments relate generally to communications systems, and more specifically, to monitoring communications of a communication session and emulating a user to address problematic events. When a user participates in conversations on online platforms such as chat rooms, social media websites, or messaging applications, the user may be subjected to problematic events, such as awkward social situations, inappropriate language, or even attempted cybercrime attacks. For example, a user may not know how to politely decline an invitation to attend a social gathering, or a user may be targeted by a cybercriminal and not know how to react.

Present invention embodiments assist a user during a problematic event occurring online by replacing the user with a communication agent. The communication agent may emulate the user's manner of speech in order to continue the conversation while responding appropriately to any issues that the user found troublesome or confusing. The communication agent may then relinquish control back to the user, or, if necessary, take further preventative measures, including terminating the conversation or blocking other chat participants from contacting the user.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
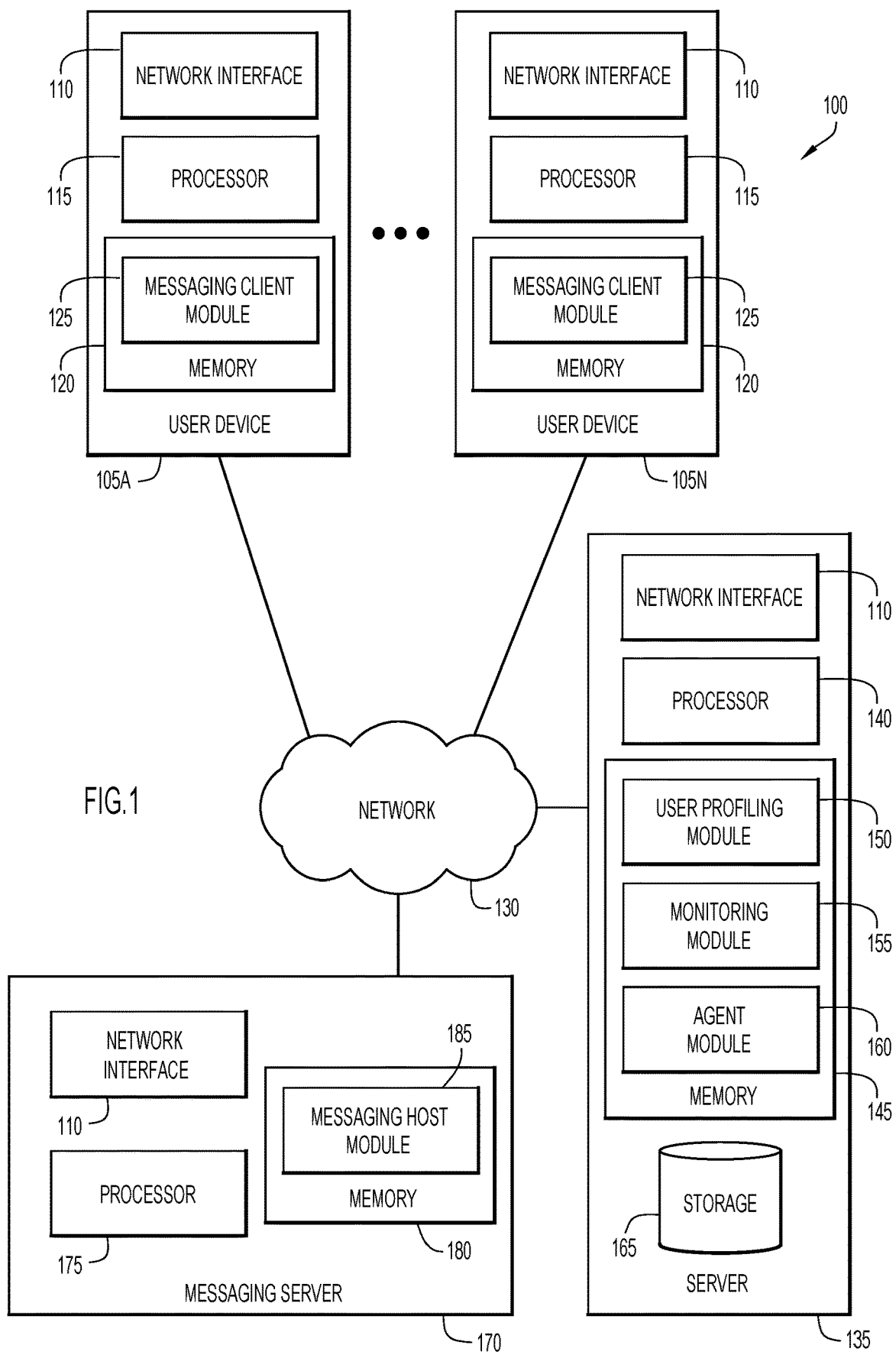
FIG. 1 is a block diagram depicting a computing environment for emulating a user with a communication agent in accordance with an embodiment of the present invention.

Present invention embodiments will now be described in detail with reference to the Figures. FIG. 1 is a block diagram depicting a computing environment 100 for emulating a user with a communication agent in accordance with an embodiment of the present invention. As depicted, computing environment 100 includes one or more user devices 105A to 105N, a server 135, and a messaging server 170. It is to be understood that the functional division among components of computing environment 100 have been chosen for purposes of explaining the present invention embodiments and is not to be construed as a limiting example.

Each user device 105 includes a network interface 110, a processor 115, and memory 120. In various embodiments of the present invention, system 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Each user device 105 may include internal and external hardware components, as depicted and described in further detail with respect to FIG. 4.

Client messaging module 125 may include one or more modules or units to perform various functions of present invention embodiments described below. Client messaging module 125 may be implemented by any combination of any quantity of software and/or hardware modules or units, and may reside within memory 120 of each user device 105 for execution by a processor, such as processor 115.

Client messaging module 125 may enable a user of each user device 105 to participate in conversations on a network-accessible medium, such as a chat room, social media website, or messaging application. For example, client messaging module 125 may enable a user to exchange messages with other chat participants. Messages exchanged by client messaging module 125 may include any form of media, such as text, images, audio, and/or video. In some embodiments, client messaging module 125 connects directly to a client module of another device in a peer-to-peer fashion in order to facilitate the exchange of messages between a user of user device 105A and a user of user device 105N. In other embodiments, client messaging module 125 indirectly exchanges messages with other devices by way of a server, such as server 135 and/or messaging server 170.

Network 130 may include a local area network (LAN), a wide area network (WAN) such as the Internet, or a combination of the two, and includes wired, wireless, or fiber optic connections. In general, network 130 can be any combination of connections and protocols that will support communications between user devices 105, server 135, and/or messaging server 170 in accordance with embodiments of the present invention.

Server 135 may include a network interface 110, processor 140, memory 145, and storage 165. In general, server 135 and its modules may detect undesirable encounters and replace the user with a communication agent in the online conversation. Server 135 may also monitor a user's communications in order for the communication agent to accurately emulate the user's manner of speech. When a user registers user device 105 with server 135, messages sent to a user or received from a remote recipient may be redirected through, or shared with, server 135 and its modules. Server 135 may include internal and external hardware components, as depicted and described in further detail with respect to FIG. 4.

User profiling module 150, monitoring module 155, and agent module 160 may include one or more modules or units to perform various functions of present invention embodiments described below. User profiling module 150, monitoring module 155, and agent module 160 may be implemented by any combination of any quantity of software and/or hardware modules or units, and may reside within memory 145 of server 135 for execution by a processor, such as processor 140.

User profiling module 150 may monitor a user's communications in order to construct a profile of the user's conversational habits and behaviors. User profiling module 150 may analyze any messages or documents authored by a user of user device 105, including e-mails, Short Message Service (SMS) messages, messages sent using third party applications, and any other sources of writing samples produced by the user that have been uploaded to a network such as the Internet and/or are accessible over network 130. In some embodiments, user profiling module 150 accesses a user's various accounts on third-party services, such as social media websites, in order to gather more information related to the user's conversational habits and behaviors.

In order to construct a profile for a user, user profiling module 150 may analyze the collected samples of a user's writings to determine patterns in the user's speech, such as vocabulary, conversational syntax, usage of slang and abbreviations, and tendency toward prolixity or brevity. User profiling module 150 may also profile a user's non-verbal communication styles, such as emotional state indicators like animations, emoticons, pictures, stickers, memetic expressions, and the like. In some embodiments, user profiling module 150 may analyze samples of a user's verbal communications by converting the user's speech to text using conventional or other speech recognition technology.

User profiling module 150 may construct a user profile by identifying the user's particular conversational tendencies using machine learning techniques. User profiling module 150 may employ various models to perform the learning (for example, neural networks, mathematical/statistical models, classifiers, and the like). User profiling module 150 may be trained using supervised or unsupervised learning. In some embodiments, user profiling module 150 is trained using one or more samples of a user's writing, such as essays that the user has written, e-mails or SMS messages that the user has written, or any other forms of writings that the user has produced. Thus, user profiling module 150 may generate a profile that a communication agent can use to replicate any type of speech patterns or linguistic behaviors associated with a user.

Monitoring module 155 may monitor a user's conversations to determine when a user has encountered a problematic event. Monitoring module 155 may actively monitor any messages sent or received by messaging client messaging module 125 for undesirable content. Monitoring module 155 may determine that a user has encountered a problematic event in response to the presence of certain key words or phrases that appear on a list. In some embodiments, monitoring module 155 does not denote a conversation as undesirable until a predetermined number of particular words or phrases are detected in total or during a set time interval.

Monitoring module 155 may determine that a user has encountered a problematic event based on the user's behavior. If the user struggles to respond to a question or statement from another participant, for example, monitoring module 155 may determine that the user requires assistance. A user's inability to respond to a question or statement may be evidenced based on information received from user device 105, such as a user beginning to input a response and deleting the response before sending, or user device 105 not entering an idle mode (or being prevented by the user from entering or remaining in an idle mode), which may suggest that the user is attempting to formulate a response. Monitoring module 155 may not determine that a user's pause is indicative of a problematic event until a predetermined amount of time has elapsed, which may be based on the amount of time a user typically takes to respond.

Monitoring module 155 may determine that a user has encountered a problematic event by detecting a cybercrime attempt. For example, another chat participant may send a hyperlink to the user that is known to direct the user to a blacklisted resource, such as a hyperlink to a phishing or typosquatting website. Monitoring module 155 may also monitor other participants in a user's conversation for requests for the user's personal identifying information, such as name and address, or financial information, such as credit card number, checking account number, or online banking account details.

Agent module 160 may control one or more communication agents that can emulate human participants in online conversations. When a communication agent replaces a user in a conversation, agent module 160 may operate the communication agent by responding to messages from other chat participants in a manner that emulates the replaced user's communication style. Agent module 160 may use information gathered from user profile module 150 in order to authentically replicate a user's conversational tendencies.

Since a communication agent may be launched in response to monitoring module 155 detecting a problematic event, agent module 160 may generate responses designed to protect the user. For example, monitoring module 155 may replace a user with a communication agent in response to another chat participant asking the user for personal information, such as the user's address or social security number. Agent module 160 may then generate a response, sent via the communication agent, that declines to offer the requested personal information in a manner that is both polite and emulative of the user's communication style. Thus, agent module 160 may direct the communication agent to send a response containing a polite denial coupled with, for example, an emoticon that the user frequently uses.

Storage 165 may include any non-volatile storage media known in the art. For example, storage 165 can be implemented with a tape library, optical library, one or more independent hard disk drives, or multiple hard disk drives in a redundant array of independent disks (RAID). Similarly, data on storage 165 may conform to any suitable storage architecture known in the art, such as a file, a relational database, an object-oriented database, and/or one or more tables. Server 135 may store data on storage 165, such as user profile data collected and generated by user profiling module 150, keywords or phrases used by monitoring module 155 to identify potentially problematic events, and histories of users, other communication session participants, and communication agents.

Messaging server 170 may include a network interface 110, a processor 175, and memory 180. In general, messaging server 170 may provide a platform on which multiple users may communicate. Messaging server 170 may include internal and external hardware components, as depicted and described in further detail with respect to FIG. 4.

Messaging host module 185 may include one or more modules or units to perform various functions of present invention embodiments described below. Messaging host module 185 may be implemented by any combination of any quantity of software and/or hardware modules or units, and may reside within memory 180 of server 170 for execution by a processor, such as processor 175.

Messaging host module 185 may host conversations between two or more users. In some embodiments, messaging host module 185 routes messages exchanged between a user and a recipient. For example, when a user of user device 105A sends a message to a recipient using user device 105N, the message may be routed through messaging host module 185. Messaging host module 185 may support the exchange of messages containing media, such as images, videos, audio, ideograms such as emojis, and the like. When a user is replaced by a communication agent, messaging host module 185 may ensure that messages sent from the communication agent appear to originate from the replaced user. Similarly, messaging host module 185 may forward messages sent to the replaced user to server 135.

Figure 2:
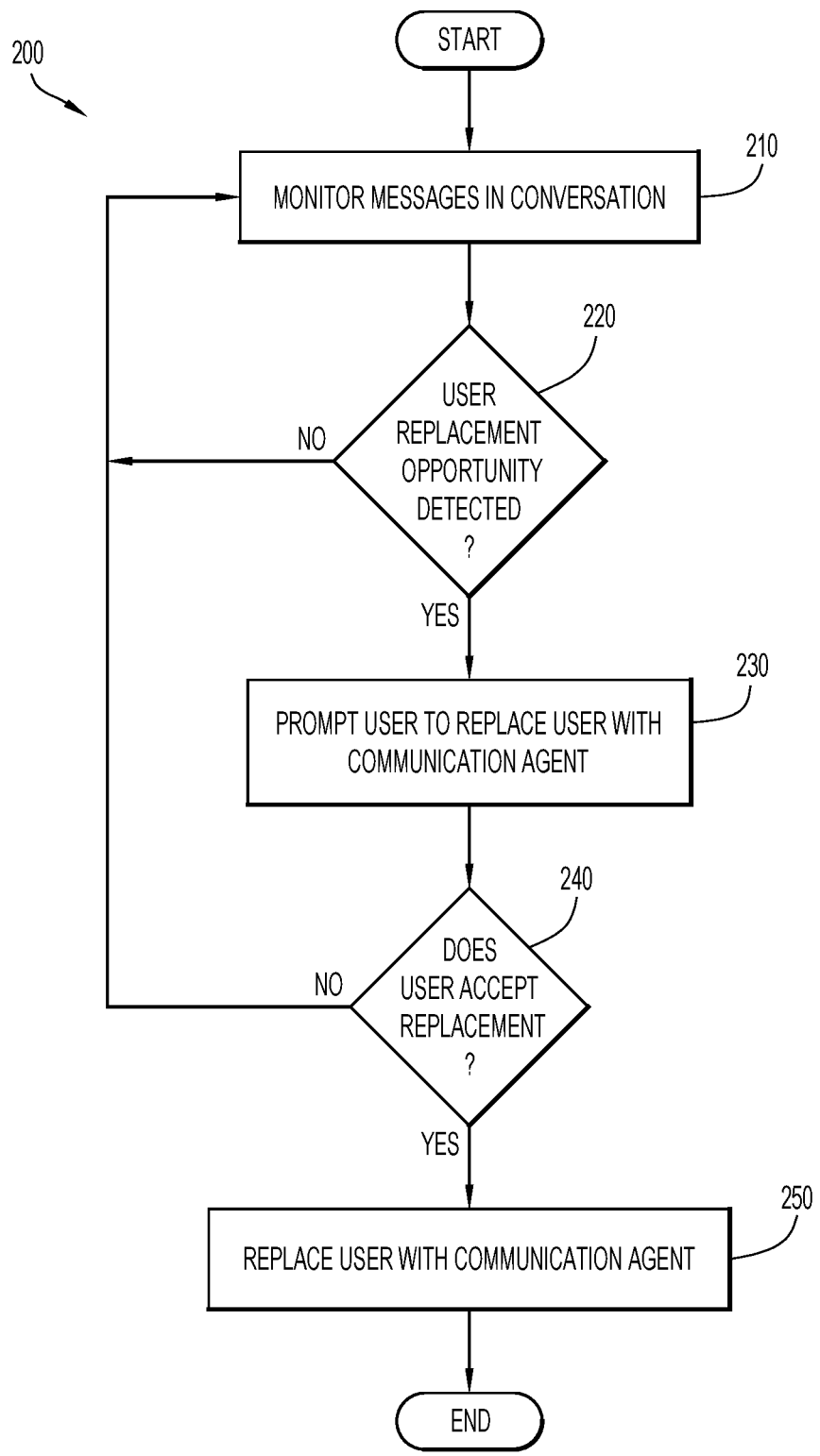
FIG. 2 is a flow chart depicting a method of replacing a user with a communication agent in accordance with an embodiment of the present invention.

FIG. 2 is a flow chart depicting a method 200 of replacing a user with a communication agent in accordance with an embodiment of the present invention.

Messages in a conversation are monitored at operation 210. A conversation may be held between two or more users, such as a user of user device 150A and a user of user device 150N. The conversation may be conducted using any conventional or non-conventional messaging service, including Short Message Service (SMS), email, or any other proprietary or open-standard messaging service. In some embodiments, messaging server 170 hosts the messaging service and facilitates the exchange of messages between users. For example, when a user of user device 105A sends a message to a recipient using user device 105N, the message is sent from user device 105A to messaging server 170, which then sends the message to user device 105N.

Messages exchanged between user device 105A and 105N may be monitored by various modules of server 135. In some embodiments, one or more user devices 105 share any messages that they send and receive with server 135. In some embodiments, messaging server 170 shares messages with server 135. Messages may be monitored by user profiling module 150, monitoring module 155, and/or agent module 160 to profile a user to identify the user's communication style, to identify potentially problematic events, and to properly respond to other chat participants using a communication agent.

Operation 220 determines whether an opportunity to replace a user with a communication agent is detected. An opportunity to replace a user with a communication agent may include a user-initiated request to be replaced by a communication agent and/or the occurrence of a problematic event in the conversation. In some embodiments, monitoring module 155 monitors the conversation between two or more users to determine when a problematic event has arisen. A problematic event may include events, such as another chat participant requesting personal information from a user or asking the user to perform an unethical or illegal action, which may be determined by monitoring module 155 using conventional or other natural language processing techniques. Monitoring module 155 may also detect a problematic event according to user behavior (for example, lengthy pauses may be indicative of a user being unsure of how to respond to a particular question) or in response to certain keywords or phrases appearing in the conversation.

A user is prompted with a request to approve or deny the user being replaced with a communication agent at operation 230. A user may receive a notification on user device 105 via messaging client messaging module 125 or the notification may be a system-level notification of user device 105.

Operation 240 determines whether a user accepts being replaced by a communication agent in a conversation. In some embodiments, operation 240 may be skipped when a user voluntarily initiates a request to be replaced with a communication agent. If a user opts to be replaced with a communication agent, the user is replaced with a communication agent at operation 250. A communication agent may be instantiated by agent module 160 and added to the conversation between the user and the other participant(s). Agent module 160 may seamlessly replace a user with a communication agent in a manner that does not indicate to any of the other chat participants that the user has been replaced. In some embodiments, the user is able to passively view as the conversation proceeds while the user is replaced by the communication agent. The user may not actually be disconnected from the messaging service in order to maintain the appearance that the user is still online and reachable. Thus, when a user is replaced by a communication agent, the other chat participants are unable to determine that the user has been replaced.

Figure 3:
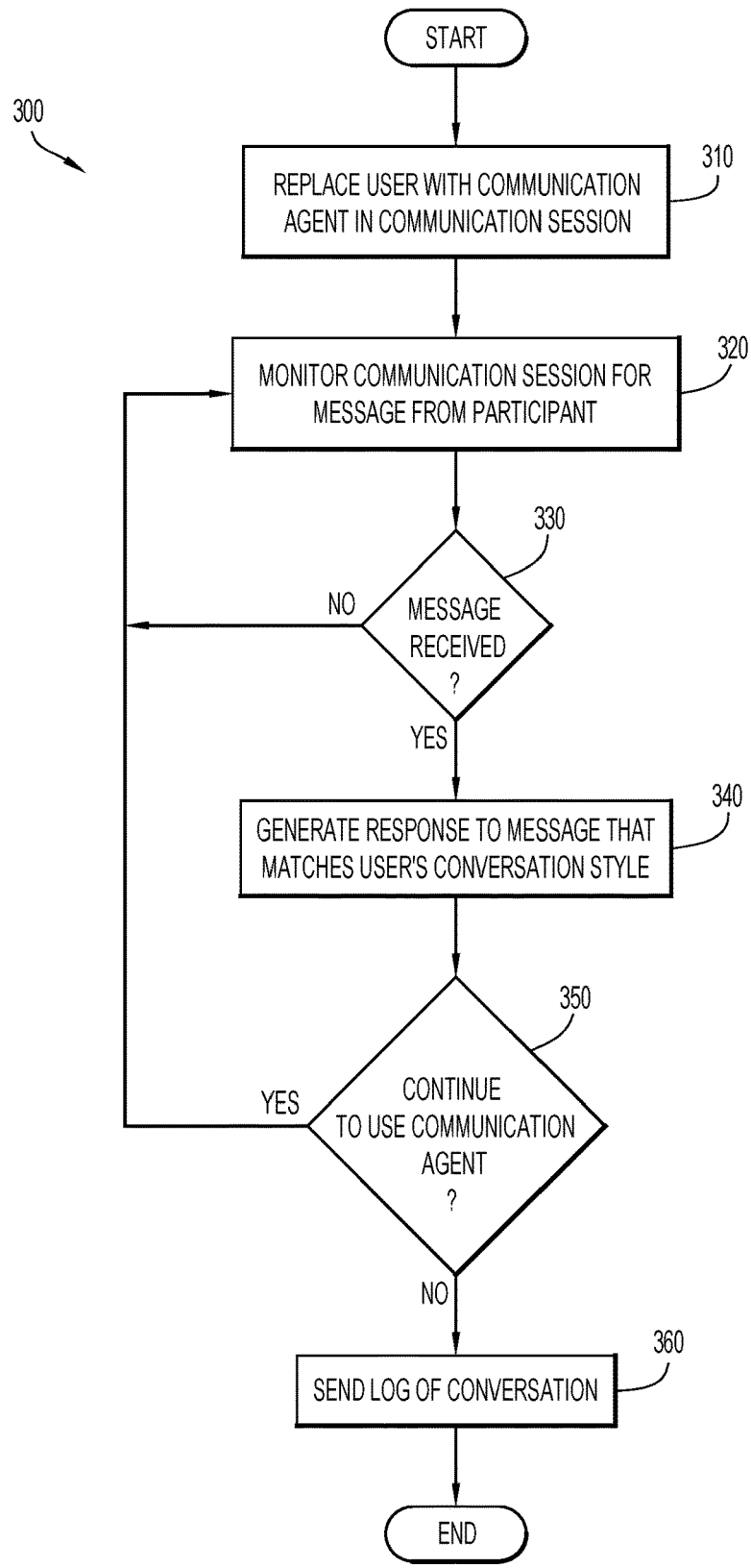
FIG. 3 is a flow chart depicting a method of emulating a user with a communication agent in accordance with an embodiment of the present invention.

FIG. 3 is a flow chart depicting a method 300 of emulating a user with a communication agent in accordance with an embodiment of the present invention.

A communication agent replaces a user in a communication session at operation 310. The user may be replaced by the communication agent in order to protect or assist the user in the case that a problematic event arises during the communication session.

The communication session is monitored for messages from other participants at operation 320. The conversation may be monitored by agent module 160 using conventional or other natural language processing techniques in order to determine a context of the conversation, including topics being discussed, so that the communication agent may convincingly participate in the conversation.

Operation 330 determines whether a message from another participant has been received. Agent module 160 may determine that another chat participant has sent a message to the user and/or any other conversation recipients. Messaging client messaging module 125 and/or messaging host module 185 may inform agent module 160 that a message has been sent from another participant. The chat participant sending the message may be unaware that a communication agent is a recipient of the message (instead of or in addition to the user to whom the message was intended).

A response is generated that matches the user's conversational style at operation 340. Agent module 160 may use natural language processing techniques to generate a response that is emulative of the user and is an appropriate response given the context of the conversation in general as well as the content of the message received from the other chat participant. Initially, the response may address the message that caused monitoring module 155 to recommend a communication agent to replace the user in the first place. Agent module 160 may refer to a user profile generated by user profiling module 150 in order to generate responses that authentically emulates the user's conversational style.

If the message is a question, agent module 160 may generate a response that addresses the question in a manner that takes into account the nature of the problematic event. For example, if monitoring module 155 had determined that the user was unsure of how to respond to a question, then agent module 160 may generate a response to that question in the linguistic style of the user. If monitoring module 155 had determined that the problematic event was an inappropriate request, agent module 160 may generate a response that politely yet firmly declines the request. For example, if a chat participant had asked the user for the user's home address, and if a user tends to use particular emoticons in conversation, then agent module 160 may generate a response, such as "sorry, but I'm not going to answer that," that also includes a smiley-face emoticon. Agent module 160 may also direct a communication agent to take other defensive measures. For example, if a chat participant is suggesting an unethical action or sending phishing links, then agent module 160 may generate a message that indicates an awareness of the threat and that also politely requests the chat participant to stop the behavior.

Operation 350 determines if the communication agent should continue participating in the communication session. Monitoring module 155 and/or agent module 160 may determine that the cause of the problematic event has ceased to occur. For example, if a chat participant was causing a problematic event, and the chat participant has left the conversation, then it may be determined that the communication agent is no longer required. The user may be prompted after a predetermined number of messages sent to and/or from the communication agent to determine if the user feels safe to re-enter the conversation. In some embodiments, a user may choose to resume control at any time. If it is determined that the communication agent should continue participating in the conversation, method 300 may return to operation 320 to listen for further messages from the other chat participant. In some embodiments, when it is determined that a communication agent should stop participating in a conversation, the communication agent may be removed and the user re-instated in the communication session.

A log of the conversation is sent at operation 360. The log of the conversation may be sent to server 135 and stored in storage 165 for future use. For example, agent module 160 may use conversation logs as input for generating authentic response using natural language processing techniques. In some embodiments, if one or more messages received from another chat participant were of an illegal or suspicious nature, the log of the conversation may be uploaded to authorities such as the provider of the messaging service of messaging server 170 or a law enforcement agency.

Figure 4:
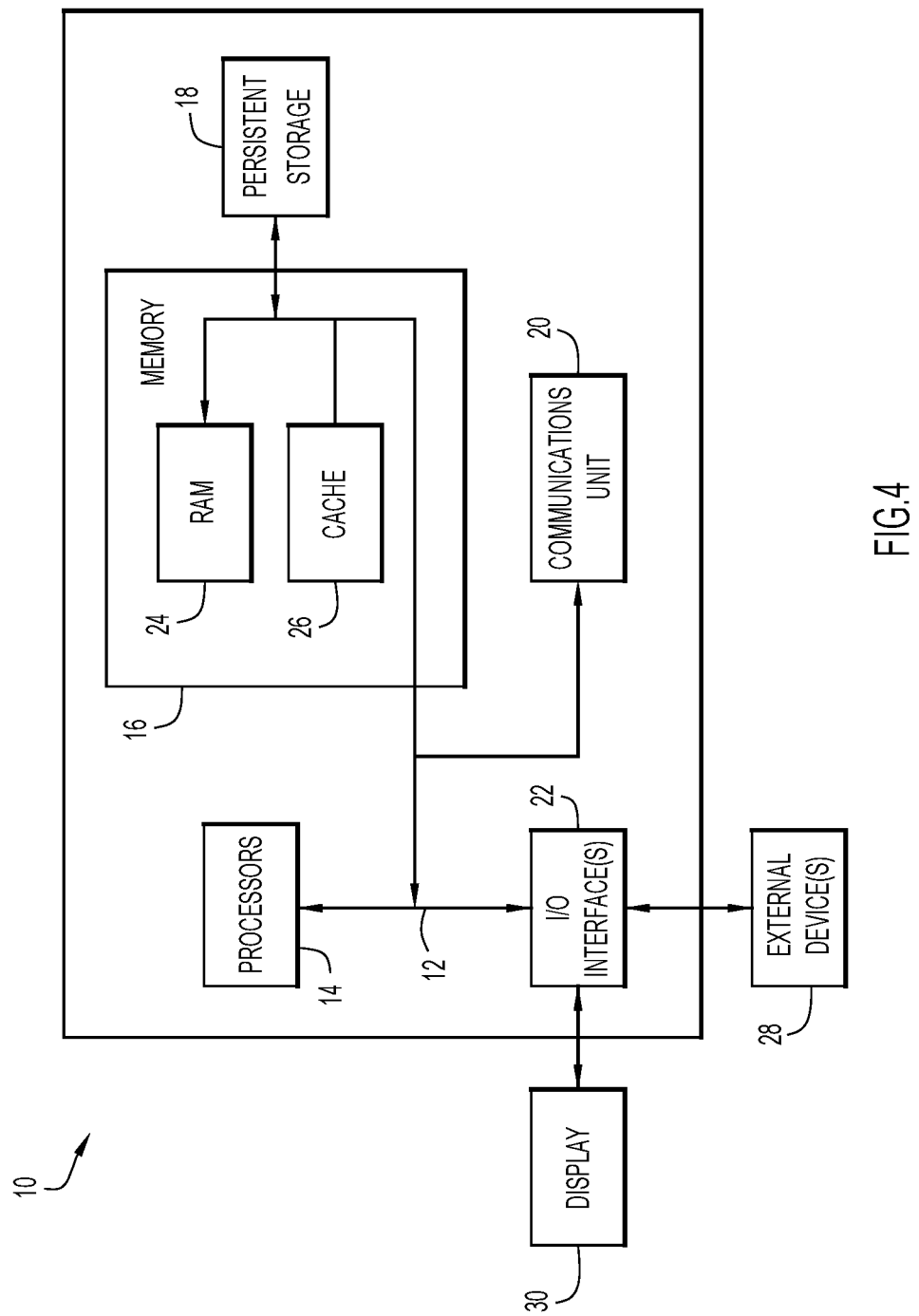
FIG. 4 is a block diagram depicting a computing device in accordance with an embodiment of the present invention.

FIG. 4 is a block diagram depicting components of a computer 10 suitable for executing the methods disclosed herein. Computer 10 may implement user device 105, server 135, and/or messaging server 170 for providing a communication agent that emulates a user in accordance with embodiments of the present invention. It should be appreciated that FIG. 4 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data, including conversation history, user profile data (such as user vocabulary data and user speech tendency data), problematic event data (such as blacklists and keyword databases), machine learning data, and natural language processing data, may be stored within any conventional or other data structures (such as files, arrays, lists, stacks, queues, records, and the like) and may be stored in any desired storage unit (such as a database, data or other repositories, queue, and the like) The data may include any desired format and arrangement, and may include any quantity of any types of fields of any size to store the data. The definition and data model for any datasets may indicate the overall structure in any desired fashion (such as computer-related languages, graphical representation, listing, and the like).

Data, including conversation history, user profile data (such as user vocabulary data and user speech tendency data), problematic event data (such as blacklists and keyword databases), machine learning data, and natural language processing data, may include any information provided to or generated by user devices 105, server 135, and/or messaging server 170. The data may include any desired format and arrangement, and may include any quantity of any types of fields of any size to store any desired data. The fields may indicate the presence, absence, actual values, or any other desired characteristics of the data of interest (such as quantity, value ranges, and the like). Data provided to user devices 105, server 135, and/or messaging server 170 may indicate the overall structure in any desired fashion (for example, computer-related languages, graphical representation, listing, and the like). The data provided to or generated by user devices 105, server 135, and/or messaging server 170 may include any data collected about conversation participants by any collection means, any combination of collected information, and any information derived from analyzing collected information, including results of machine learning and natural language processing.

The present invention embodiments may employ any number of any type of user interface (for example, a Graphical User Interface (GUI), command-line, prompt, and the like) for obtaining or providing information (such as data provided to or generated by user devices 105, server 135, and/or messaging server 170), where the interface may include any information arranged in any fashion. The interface may include any number of any types of input or actuation mechanisms (such as buttons, icons, fields, boxes, links, and the like) disposed at any locations to enter/display information and initiate desired actions via any suitable input devices (such as a mouse, keyboard, and the like). The interface screens may include any suitable actuators (such as links, tabs, and the like) to navigate between the screens in any fashion.

It will be appreciated that the embodiments described above and illustrated in the drawings represent only a few of the many ways of providing a communication agent that emulates a user.

The environment of the present invention embodiments may include any number of computer or other processing systems (for example, client or end-user systems, server systems, and the like) and databases or other repositories arranged in any desired fashion, where the present invention embodiments may be applied to any desired type of computing environment (such as cloud computing, client-server, network computing, mainframe, stand-alone systems, and the like). The computer or other processing systems employed by the present invention embodiments may be implemented by any number of any personal or other type of computer or processing system (for example, a desktop, laptop, PDA, mobile devices, and the like), and may include any commercially available operating system and any combination of commercially available and custom software (including browser software, communications software, server software, messaging client messaging module 125, user profiling module 150, monitoring module 155, agent module 160, and messaging host module 185). These systems may include any types of monitors and input devices (for example, a keyboard, mouse, voice recognition, and the like) to enter and/or view information.

It is to be understood that the software (including browser software, communications software, server software, messaging client messaging module 125, user profiling module 150, monitoring module 155, agent module 160, and messaging host module 185) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (such as a LAN, WAN, Intranet, Internet, hardwire, modem connection, wireless, and the like). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (including browser software, communications software, server software, messaging client messaging module 125, user profiling module 150, monitoring module 155, agent module 160, and messaging host module 185) may be available on a non-transitory computer useable medium (such as magnetic or optical mediums, magneto-optic mediums, floppy diskettes, CD-ROM, DVD, memory devices, and the like) of a stationary or portable program product apparatus or device for use with stand-alone systems or systems connected by a network or other communications medium.

The communication network may be implemented by any number of any type of communications network (such as a LAN, WAN, Internet, Intranet, VPN, and the like). The computer or other processing systems of the present invention embodiments may include any conventional or other communications devices to communicate over the network via any conventional or other protocols. The computer or other processing systems may utilize any type of connection (such as wired, wireless, fiber optic, and the like) for access to the network. Local communication media may be implemented by any suitable communication media (such as a local area network (LAN), hardwire, wireless link, Intranet, and the like).

The system may employ any number of any conventional or other databases, data stores or storage structures (such as files, databases, data structures, data or other repositories, and the like) to store information (including data provided to or generated by user devices 105, server 135, and/or messaging server 170). The database system may be implemented by any number of any conventional or other databases, data stores or storage structures (such as files, databases, data structures, data or other repositories, and the like) to store information (including data provided to or generated by user devices 105, server 135, and/or messaging server 170). The database system may be included within or coupled to the server and/or client systems. The database systems and/or storage structures may be remote from or local to the computer or other processing systems, and may store any desired data (including data provided to or generated by user devices 105, server 135, and/or messaging server 170).

The present invention embodiments may employ any number of any type of user interface (such as a Graphical User Interface (GUI), command-line, prompt, and the like) for obtaining or providing information (including data provided to or generated by user devices 105, server 135, and/or messaging server 170), where the interface may include any information arranged in any fashion. The interface may include any number of any types of input or actuation mechanisms (for example, buttons, icons, fields, boxes, links, and the like) disposed at any locations to enter/display information and initiate desired actions via any suitable input devices (for example, a mouse, a keyboard, and the like). The interface screens may include any suitable actuators (links, tabs, and the like) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for emulating user communications within a communication session, the method comprising:
   monitoring communications between a user and at least one participant to determine that a message for the user from the at least one participant includes content pertaining to a problematic event, wherein the problematic event is identified by applying natural language processing to the message, and wherein the problematic event includes one or more of: a request for personal information from the user, a cybercrime attempt by the at least one participant, and a question that the user is unable to answer;
   replacing the user with a communication agent in the communication session and generating a response for the user to the message utilizing natural language processing to emulate a conversational style of the user; and
   sending, using the communication agent, the response to the at least one participant in the communication session to address the problematic event.

2. The computer-implemented method of claim 1, wherein replacing the user with a communication agent further comprises preventing the user from participating in the communication session while the user is replaced by the communication agent.

3. The computer-implemented method of claim 1, further comprising:
   requesting permission from the user to replace the user with the communication agent; and
   wherein the user is replaced with the communication agent in response to the user granting permission.

4. The computer-implemented method of claim 1, wherein a past conversation history of the user is used to train the communication agent based on machine learning techniques.

5. The computer-implemented method of claim 1, further comprising:
    determining that the problematic event is no longer occurring; and
    removing the communication agent from the communication session and restoring the user.

6. A computer system for emulating user communications within a communication session, the computer system comprising:
    one or more computer processors;
    one or more computer readable storage media;
    program instructions stored on the one or more computer readable storage media for execution by at least one of the one or more computer processors, the program instructions comprising instructions to:
    monitor communications between a user and at least one participant to determine that a message for the user from the at least one participant includes content pertaining to a problematic event, wherein the problematic event is identified by applying natural language processing to the message, and wherein the problematic event includes one or more of: a request for personal information from the user, a cybercrime attempt by the at least one participant, and a question that the user is unable to answer;
    replace the user with a communication agent in the communication session and generating a response for the user to the message utilizing natural language processing to emulate a conversational style of the user; and
    send, using the communication agent, the response to the at least one participant in the communication session to address the problematic event.

7. The computer system of claim 6, wherein replacing the user with a communication agent further comprises preventing the user from participating in the communication session while the user is replaced by the communication agent.

8. The computer system of claim 6, further comprising instructions to:
    request permission from the user to replace the user with the communication agent; and
    wherein the user is replaced with the communication agent in response to the user granting permission.

9. The computer system of claim 6, wherein a past conversation history of the user is used to train the communication agent based on machine learning techniques.

10. The computer system of claim 6, further comprising instructions to:
    determine that the problematic event is no longer occurring; and
    remove the communication agent from the communication session and restore the user.

11. A computer program product for emulating user communications within a communication session, the computer program product comprising one or more computer readable storage media collectively having program instructions embodied therewith, the program instructions executable by a computer to cause the computer to:
    monitor communications between a user and at least one participant to determine that a message for the user from the at least one participant includes content pertaining to a problematic event, wherein the problematic event is identified by applying natural language processing to the message, and wherein the problematic event includes one or more of: a request for personal information from the user, a cybercrime attempt by the at least one participant, and a question that the user is unable to answer;
    replace the user with a communication agent in the communication session and generating a response to the message utilizing natural language processing to emulate a conversational style of the user; and
    send, using the communication agent, the response to the at least one participant in the communication session to address the problematic event.

12. The computer program product of claim 11, wherein replacing the user with a communication agent further comprises preventing the user from participating in the communication session while the user is replaced by the communication agent.

13. The computer program product of claim 11, further comprising program instructions to:
    request permission from the user to replace the user with the communication agent; and
    wherein the user is replaced with the communication agent in response to the user granting permission.

14. The computer program product of claim 11, wherein a past conversation history of the user is used to train the communication agent based on machine learning techniques.

15. The computer program product of claim 11, further comprising program instructions to:
    determine that the problematic event is no longer occurring; and
    remove the communication agent from the communication session and restore the user.

16. The computer-implemented method of claim 1, wherein the problematic event is further identified based on user behavior upon the user receiving the message.

17. The computer system of claim 6, wherein the problematic event is further identified based on user behavior upon the user receiving the message.

18. The computer program product of claim 11, wherein the problematic event is further identified based on user behavior upon the user receiving the message.

* * * * *